United States Patent [19]

Magnusson et al.

[11] 4,232,100

[45] Nov. 4, 1980

[54] ELECTRODE PLATE FOR LEAD ACCUMULATORS

[75] Inventors: Ulf S. G. Magnusson; Lars E. Uhrbom, both of Hultsfred, Sweden

[73] Assignee: Nordiska Ackumulatorfabriker Noack AB, Stockholm, Sweden

[21] Appl. No.: 897,214

[22] Filed: Apr. 17, 1978

[30] Foreign Application Priority Data

May 27, 1977 [DE] Fed. Rep. of Germany ....... 2723946

[51] Int. Cl.³ ......................... H01M 4/14; H01M 4/16
[52] U.S. Cl. .................................... 429/217; 429/137; 429/233; 427/58
[58] Field of Search ...................... 429/217, 233, 137; 29/623.1; 427/58

[56] References Cited

U.S. PATENT DOCUMENTS

| 756,176 | 3/1904 | Meygret et al. | 429/137 |
|---|---|---|---|
| 2,108,748 | 2/1938 | Harner | 429/217 |
| 2,673,230 | 3/1954 | Brennan | 429/137 |
| 2,810,775 | 10/1957 | Raphael et al. | 429/254 |
| 3,905,829 | 9/1975 | Weissman et al. | 429/233 |
| 4,071,946 | 2/1978 | Nilsson | 429/217 |

FOREIGN PATENT DOCUMENTS 664290 6/1963 Canada ..................................... 429/137

*Primary Examiner*—Donald L. Walton
*Attorney, Agent, or Firm*—Fred Philpitt

[57] ABSTRACT

The present invention is concerned with the problem of preventing dust-formation on electrode plates of lead. The problem is solved by applying a coating of water-insoluble plastics material on the surface or surfaces of the electrode plate. Examples of suitable materials are polyacrylates, polystyrene, polyvinylacetate and polyvinylchloride. Copolymers may also be used.

6 Claims, No Drawings

ELECTRODE PLATE FOR LEAD ACCUMULATORS

The present invention relates to an electrode plate for lead accumulators, the surface of which plate is covered with a dust-fixing coating of a polymeric plastics material.

An object of the invention is to fix the lead dust created on the surfaces of the electrode plates, during the manufacturing process, thereby to satisfy requirements in regard of factory hygien and the protection of the inner environment. The danger of dust emmission in the manufacture of electrodes is very high when the plates are exposed to rapid variations in temperature, e.g. when the plates are subjected to intensive drying operations and then passed to manually or mechanically effected subsequent working stages. When an electrode plate is dried rapidly, moisture present in the pores is vaporized and rises to the surfaces of the plate carrying small particles of lead thereto, these particles collecting on said surfaces to form a loose layer of dust thereon. This phenomenon is manifested by the fact that the surfaces of the plate become roughened to a certain extent.

In the manufacture of lead electrodes, lead oxide is mixed with water and diluted with sulphuric acid to form a paste, whereafter the paste is smoothed into a grid. The pasted grid is then dried and cured, formed, washed, dried, and finally the thus obtained plate is then assembled to form a battery.

The U.S. Pat. No. 3,905,829 describes a method of treating newly pasted electrode plates, by brushing or spraying an aqueous solution of water-soluble organic polymeric compounds thereon or by immersing the plates in such a solution. Examples of such water-soluble compounds are polyvinyl alcohol, polyethylene oxide, alkyl cellulose and starch. These compounds leave transitorily a thin film over the surfaces of the plate, which film is washed out during the forming process until only small residues remain which are unharmful to the electrical properties of the plates. An electrode plate thus treated has a reduced tendency to form dust.

In practice it has been found that when manufacturing grid plates, and in particularly positive grid plates, the greatest amount of dust is formed during the further treatment to which the plates are subjected after the tank-forming process and the drying process, thus between the drying process and the assembly of the plates in the battery casing. If a layer of polymer consisting of water-soluble compounds has already been applied after pasting the grid, the paste will not be present in this stage in an amount sufficient to provide the desired dust-binding effect. It is a disadvantage to apply such known dust-binding materials in conjunction with the drying process subsequent to the forming process, since there is no further washing step and consequently the soluble organic substances will be present in the electrolyte subsequent to assembling the battery. This can result, for example, in the formation of foam or scum when charging the battery.

If the forming process is a container-forming process (Blockkastenformation), the assembly work will be done with unformed plates, and hence the assembly people are interested in having the plates treated against dusting at an early stage of the manufacture of the plates, e.g. after the pasting step.

Thus, the problem to be solved by the invention is one of providing the electrode plates with a coating of polymer which lasts over the manufacturing process, which coating shall prevent the formation of dust to a great extent and shall not act negatively on the electrical properties of the plate.

This problem is solved according to the invention by the fact that the coating consists of a water-insoluble plastics material.

Thin coatings of thermoplastic polymerisation resins have been found particularly suitable for binding the dust in accordance with the invention. To this group belong both simple polymers, e.g. polyacrylate, polystyrene, polyvinylacetate and polyvinyl chloride, and copolymers having the components styrene and acrylate, styrene and butadiene, vinyl acetate and acrylate or vinyl acetate and maleinate, and mixtures of these copolymers. These products are some times used in the paint or enamel industry as paint or enamel raw materials. As products from HOECHSI AG, they are known under the trade name "Mowilith".

Normally, the recited polymerization resins are delivered in the form of a 50-% aqueous dispersion, which may be provided with emulsifiers and plastifiers.

The coating according to the invention is applied to the electrode plates, however, from a highly diluted dispersion—e.g. in the ratio 1:5—, not only for reasons of cost but also because the thickness of the coating which remains must not be such as to affect the electrical properties of the plate. On the other hand, the dispersion shall be one which is able to penetrate deeply into the mass and to form an adhesive, enamel-like film.

The dispersion is conveniently applied to the plates by immersing the same into a bath of said dispersion, although the dispersion may also be applied by spraying, brushing or rolling.

By rolling is meant a method in which the dispersion is applied by two sequentially arranged rollers arranged to rotate in opposite directions, while the electrode plates are caused to move between the rollers from the top thereof downwardly or from backwards to forwards. The rollers are suitably covered with foam rubber or felt.

In accordance with the invention, the electrode plates are either treated whilst dry or, also, when wet. As will readily be understood, both positive and negative plates may be treated, more specifically both after the pasting step and after the forming step. It is particularly suitable to treat positive plates after the forming step, since these cause the greatest amount of dust formation.

A special advantage afforded by the dust-fixing method according to the invention, is that when treating pasted plates, it does not matter what polarity they obtain through the latter forming process or whether they shall be subjected to a tank-forming process or a container-forming process. If, however, the form which the treatment shall take is established from the beginning, it is recommended that specific concentrations of the polymerization resins are contained.

Thus, a resin concentration of 1:1 to 1:5 when treating both positive and negative plates subsequent to the pasting step (and also optionally after a quick-drying step) will provide a reduction in dust formation of 90% compared with unformed plates which have not been treated to fix the dust. The subsequent curing process is not negatively affected by the treatment, from which the conclusion can be drawn that the coating is also sufficiently permeable to permit the exchange of oxygen and steam during said curing process.

When taking into account those electrical properties which the batteries exhibit after container-forming, the optimal concentration of the resins in the case of newly pasted plates would seem to lie at 1:3, corresponding to a content of approximately 12% solid substance.

But even after tank forming, the plates treated with the same resin dispersion exhibit a similar degree of dust freeness as the same treated plates before the tankformation step. This result is surprising, and it can only be concluded that the treatment of newly pasted plates is not dependent upon the method by which they are later formed.

It will be understood that positive plates which have been already formed can also be treated in accordance with the invention. In this respect dust is fixed satisfactorily with very weak resin concentration (down to 1:20) provided that the plates have previously been washed and dried. The plates ability of withstanding high currents is, admittedly in this case considerably lowered, although a normal value in this respect can be reached after some few conditioning cycles.

The formed plates can even be immersion-treated whilst they are still wet after the washing step. The requisite diffusion exchange between the washing liquid and the resin dispersion in the pores must then admittedly be supported by a somewhat higher concentration of the latter from 1:2 to 1:10, preferably 1:4 to 1:5. This corresponds to a suitable solid substance content of approx. 7 to 8%.

The extent to which loose dust is avoided under these circumstances is not quite as great as that in accordance with the aforementioned conditions, but is, at 70%, still satisfactory.

Consequently, the immersion of wet plates (immersion time 1 minute to 60 minutes) has the advantage process-wise that only a small amount of work is required and that additional equipment costs can be maintained at the lowest level. After passing the washing step, the plates are stacked in frames and passed batchwise through the immersion bath, before being charged to the drying oven.

A number of practical examples relating to fixing the dust on positively, formed, in this case dry grid plates:

Different dilutions were prepared from a 50-percent aqueous dispersion of a copolymer of styrene and acrylic acid ester (Mowilith DM 60 or Mowilith 6051-S). Positively formed grid plates were immersion-treated in these dilutions for 10 sec. and then dried for 2 hrs at 60° C. In order to assess the tendency of the plates to create dust, the dry plates were shaken on a shaking table under defined conditions in a vertical direction. At the same time, a defined air stream was drawn from the closed shaking chamber with the aid of a vacuum pump, and the fine dust entrained with the air was caught in a dust filter.

The results obtained are given in the following table in the form of mean values from at least three measurements in each particular case.

| Dilution of original dispersion | Weight increase per plate (g) | Dust amount (mg) |
| --- | --- | --- |
| Untreated | — | 22.0 |
| 1 : 2 | 1.258 | 0.2 |
| 1 : 4 | 0.629 | 0.4 |
| 1 : 8 | 0.334 | 0.6 |
| 1 : 10 | 0.209 | 3.8 |
| 1 : 12 | 0.220 | 3.7 |
| 1 : 24 | 0.170 | 10.5 |

It will be seen from the table that the amount of dust formed decreases at the same time as the binding agent concentration increases. Binding of the dust is sufficient when the increase in weight caused by the polymer comprises 0.2 to 0.3 g/electrode plate (calculated on electrode plates having the dimensions $149 \times 106 \times 1.6$ mm), which corresponds to a dilution intended for use of approx. 1:10. Comparable results were obtained when fixing dust on unformed plates, which in themselves create less dust.

Dust-fixing in accordance with the invention can, subsequent to the drying step, be incorporated in the fabrication system without problem as an additional spray or immersion zone. Considerable protection is given to the workmen producing the plates, at extraordinarily low costs for material per grid plate manufactured.

What is claimed is:

1. An electrode plate for lead accumulators, the surfaces of which plate are provided with a dust-fixing coating of a copolymer of styrene and acrylic acid ester, characterized in that the coating comprises a film of a water-insoluble plastics material.

2. In the known method for manufacturing an electrode plate for lead accumulators, the improvement comprising treating the electrode plate with a dispersion of a copolymer of styrene and acrylic acid ester by immersion, spraying or rolling to form a film thereon.

3. A method according to claim 2 characterized in that the plates are treated after the forming step.

4. A method according to claim 2 characterized in that the plates are treated before the forming step.

5. A method according to claim 2 characterized in that dispersion is an aqueous dispersion.

6. A method according to claim 4 characterized in that the dispersion has a solid-substance content of from .2% to 20%.

* * * * *